US009302629B1

(12) United States Patent
Hall et al.

(10) Patent No.: US 9,302,629 B1
(45) Date of Patent: Apr. 5, 2016

(54) INTEGRATED TRAY TABLE FOR A MOTOR VEHICLE

(71) Applicant: FORD GLOBAL TECHNOLOGIES, LLC, Dearborn, MI (US)

(72) Inventors: Amber LaVerne Hall, Oak Park, MI (US); Sean David Fannin, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 14/526,732

(22) Filed: Oct. 29, 2014

(51) Int. Cl.

| | |
|---|---|
| ***B60R 7/06*** | (2006.01) |
| ***B60R 7/08*** | (2006.01) |
| ***B60R 11/02*** | (2006.01) |
| ***B60N 3/00*** | (2006.01) |

(52) U.S. Cl.
CPC . *B60R 7/08* (2013.01); *B60N 3/002* (2013.01); *B60R 11/02* (2013.01)

(58) Field of Classification Search
CPC .......... B60N 3/004; A47B 9/14; A47C 13/00; B64D 11/0638; Y10T 29/49826; G02B 6/4452; G02B 6/4455; G02B 6/4471; B65D 2571/0066; B65D 5/52; B60R 7/06; B60R 2011/0005
USPC ....................................... 296/37.12; 206/557
See application file for complete search history.

(56) References Cited

U.S. PATENT DOCUMENTS 4,792,174 A * 12/1988 Shioda .................. B60N 3/002 108/45
4,826,058 A * 5/1989 Nakayama ............ B60N 3/102 224/275

(Continued)

FOREIGN PATENT DOCUMENTS

DE 19539784 A1 4/1997
DE 19755621 A1 6/1999

(Continued)

OTHER PUBLICATIONS

English machine translation of DE19539784.

(Continued)

*Primary Examiner* — Kiran B Patel
(74) *Attorney, Agent, or Firm* — Vichit Chea; King & Schickli, PLLC

(57) ABSTRACT

An integrated tray table is provided for a motor vehicle. The tray table includes a support that extends in a first plane and a retention panel that includes a pivot connecting the retention panel to the support. The retention panel is pivotally displaceable about the pivot between a home position wherein the retention panel extends in second plane substantially parallel to or the same as the first plane and a deployed position wherein the retention panel rests within a third plane in an angle to the second plane.

20 Claims, 7 Drawing Sheets

S 22 F 10 R C 10 52 46 32 36 22 28 34 16 40 14 38

(56) References Cited

U.S. PATENT DOCUMENTS 4,907,775 A * 3/1990 Lorence ................. B60N 3/102 248/311.2
4,953,771 A * 9/1990 Fischer .................. B60N 3/102 108/44
5,087,008 A * 2/1992 Miller ...................... A47C 7/70 248/311.2
5,265,072 A * 11/1993 Numata ............... G11B 17/056 360/99.06
5,289,962 A * 3/1994 Tull ........................ B60N 3/102 211/41.2
5,737,304 A * 4/1998 Soga ...................... G11B 33/08 360/99.18
5,944,240 A * 8/1999 Honma .................. B60N 3/102 224/281
6,024,395 A * 2/2000 Kang ..................... B60N 3/102 296/37.1
6,056,175 A * 5/2000 Mieglitz ................. B60K 37/04 224/282
6,349,913 B1 * 2/2002 Jankowski ............. B60N 3/108 224/281
6,438,310 B1 * 8/2002 Lance .................. G02B 6/4455 385/135
6,634,690 B2 * 10/2003 Schaal ..................... B60N 3/08 224/484
6,648,194 B2 * 11/2003 Schaal ................... B60N 3/102 224/281
6,808,097 B2 * 10/2004 Kim ..................... B60N 2/4686 224/282
6,837,408 B2 * 1/2005 Dieringer ............... B60N 3/102 224/281
6,921,141 B1 * 7/2005 Porco ...................... B60R 11/02 312/100
6,942,267 B1 * 9/2005 Sturt ...................... B60N 3/107 248/311.2
6,971,618 B2 * 12/2005 Moyer ................ B29C 45/0081 248/311.2
7,140,660 B2 * 11/2006 Oana ...................... B60N 3/102 224/926
7,226,138 B2 * 6/2007 Katagiri ................. B60N 3/102 108/45
7,469,951 B2 12/2008 Welschholz et al.
7,591,395 B2 * 9/2009 Hamaguchi ........... E05C 19/022 220/830
8,127,962 B2 * 3/2012 Kogami .................... B60R 7/04 220/326
8,398,130 B2 * 3/2013 Park .......................... B60R 7/06 292/333
8,411,446 B2 * 4/2013 Becklin ................... G06F 1/182 206/594
9,010,599 B2 * 4/2015 Shindo ................... B60N 3/102 224/483
9,115,515 B1 * 8/2015 South ...................... E05B 77/54
9,211,828 B2 * 12/2015 Masuda ................. B60N 3/102
2001/0043542 A1 * 11/2001 Omori ................ G11B 17/0282 720/649
2003/0001402 A1 * 1/2003 Sawatani .................. B60R 7/04 296/37.1
2009/0085366 A1 * 4/2009 Doom ....................... B60R 7/06 296/37.12
2012/0049558 A1 * 3/2012 Souillac .................. B60R 11/00 296/37.12
2012/0097725 A1 4/2012 Lee
2013/0093205 A1 4/2013 Stephan
2014/0153163 A1 6/2014 Harding et al.
2014/0167438 A1 6/2014 Lambert et al.
2014/0292016 A1 * 10/2014 Masuda .................... B60R 7/06 296/37.12
2014/0354002 A1 * 12/2014 Bisceglia ................ B60R 11/02 296/37.12
2015/0068434 A1 * 3/2015 Pajic ...................... A47B 23/00 108/25
2015/0343962 A1 * 12/2015 Le Leizour ............. B60R 11/02 361/809

FOREIGN PATENT DOCUMENTS

DE 102012024430 A1 6/2014
EP 0950572 A2 10/1999

OTHER PUBLICATIONS

English machine translation of DE19755621.
English machine translation of DE102012024430.
English machine translation of EP0950572.

* cited by examiner

SPRING
10
14
16
18
22
24
26
28
30
32
36
44
46

INTEGRATED TRAY TABLE FOR A MOTOR VEHICLE

TECHNICAL FIELD

This document relates generally to the motor vehicle equipment field and, more particularly, to an integrated tray table that may be deployed from the instrument panel/center control stack to hold a smartphone or other device.

BACKGROUND

Today many vehicle operators use their smartphones to, for example, access maps for navigation or provide music or entertainment during the operation of a motor vehicle. At this time it is believed that no original equipment manufacturer offers a system for maintaining a smartphone in a readily accessible position in a motor vehicle where the driver may conveniently and safely view the screen of the smartphone. This document relates to an integrated tray table for a motor vehicle that addresses and meets this need.

SUMMARY

In accordance with the purposes and benefits described herein, an integrated tray table is provided for a motor vehicle. That integrated tray table comprises a support extending in a first plane and a retention panel including a pivot connecting the retention panel to the support. The retention panel is pivotally displaceable about the pivot between a home position wherein the retention panel extends substantially parallel to or within the first plane and a deployed position wherein the retention panel rests within a second plane at an angle to the first plane.

The support panel includes a front face. The retention panel further includes a stop. The stop is position on the retention panel between the pivot and the front face when the retention panel is in the home position. The support includes a first side rail, a second side rail and a base panel extending between the first and second side rails. The base panel includes an opening. The retention panel is received in that opening and is pivotally connected to the base panel.

In one possible embodiment the base panel has a top face and a bottom face and the retention panel has a first face and a second face. Further, the retention panel includes a U-shaped channel. The U-shaped channel extends at least along a first edge of the retention panel. In one possible embodiment the U-shaped channel is provided on the second face so as to be oriented toward the bottom face when the retention panel is in the home position. In one possible embodiment the U-shaped channel also extends along at least a portion of two opposing side edges of the retention panel. Further the stop projects from the first face of the retention panel outwardly from at least one of the first and second opposing side edges.

In one possible embodiment, the pivot comprises two opposed pivot pins and the stop comprises two opposed stop tabs. In one possible embodiment, the support forms a drawer received within an instrument panel of the motor vehicle. Further the tray table includes a biasing element that biases the retention panel into the deployed position when the drawer is fully open.

In the following description, there are shown and described several preferred embodiments of the integrated tray table. As it should be realized, the integrated tray table is capable of other, different embodiments and its several details are capable of modification in various, obvious aspects all without departing from the integrated tray table as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated tray table and together with the description serve to explain certain principles thereof. In the drawing figures.

Figure 3A:
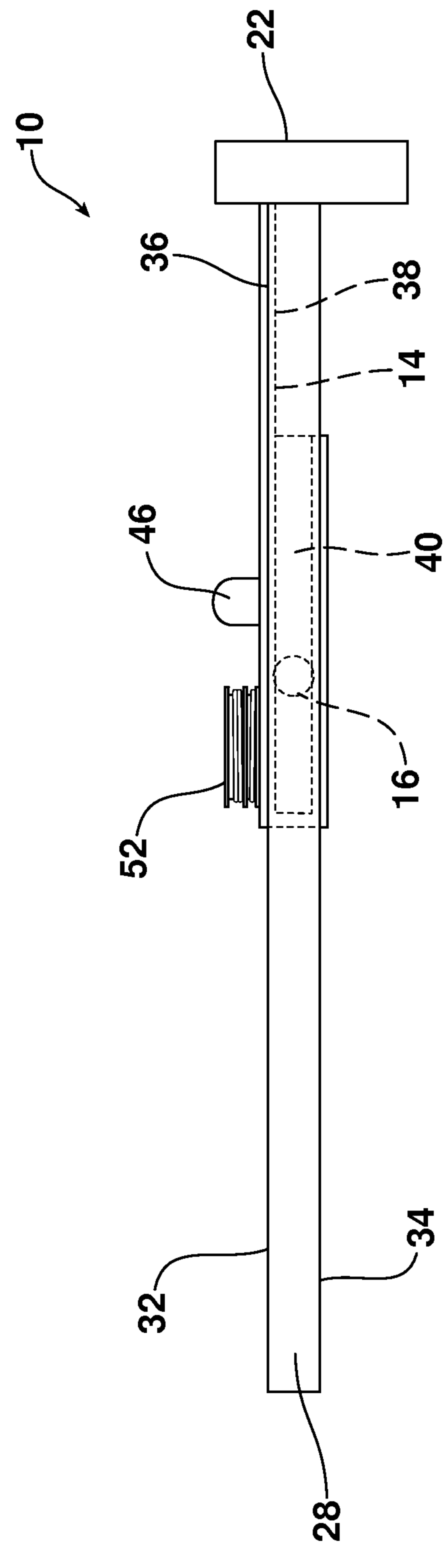
Figure 3B:
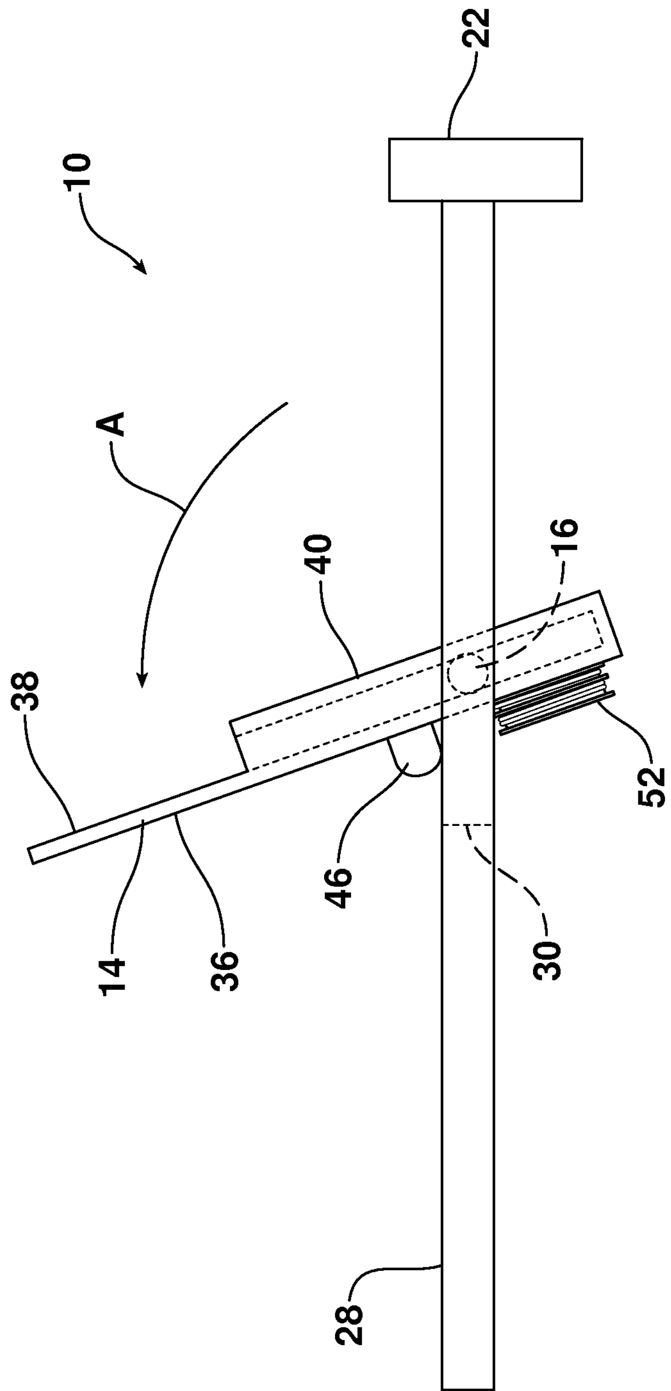

FIGS. 3*a* and 3*b* are schematic side elevational views (near side rail removed) showing, respectively, the tray table in the home and fully deployed positions.

Figure 4:
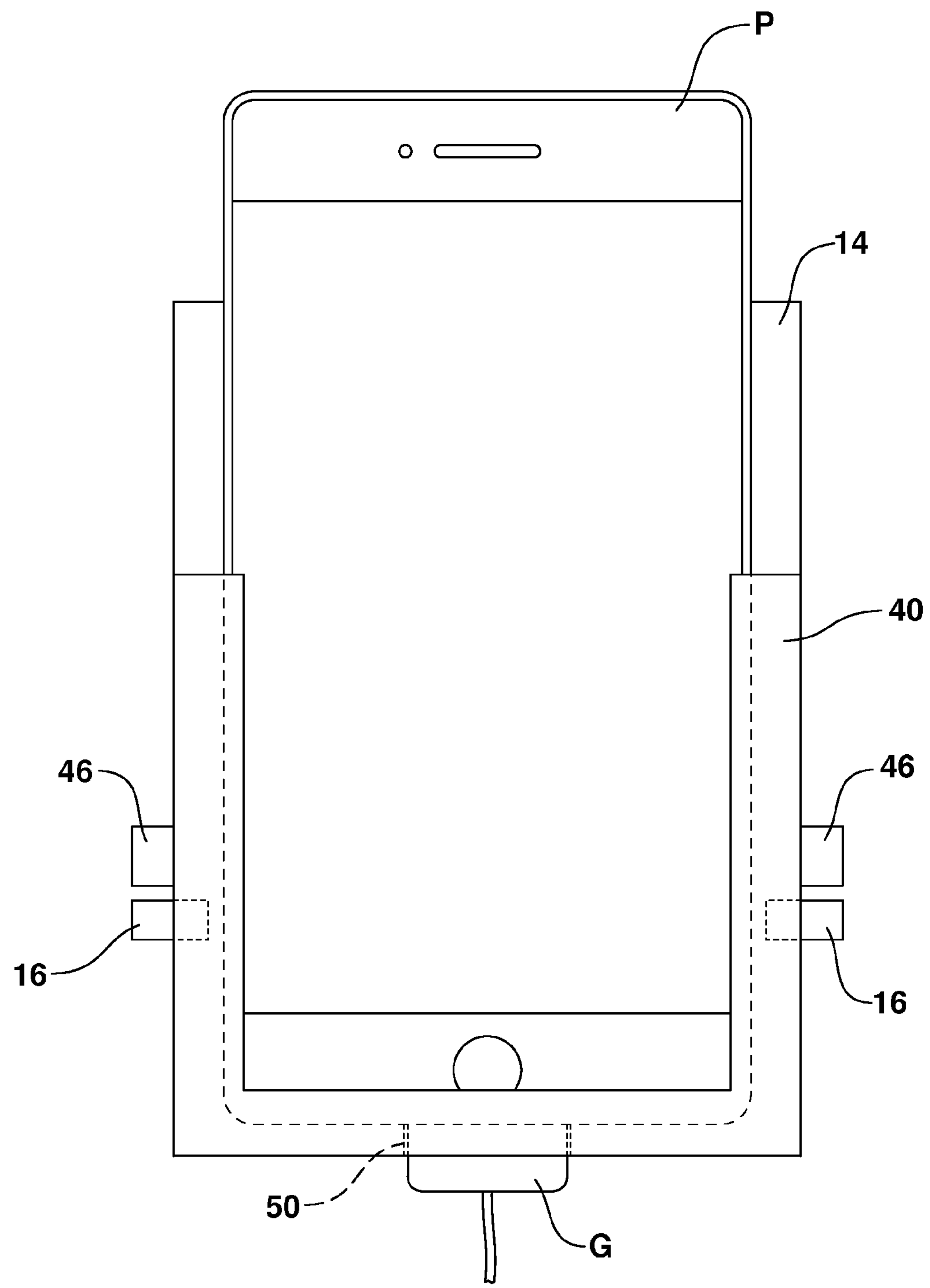

FIG. 4 is a front face view of the tray table in the deployed position with a smartphone held in place by the shelf and U-shaped channel formed on the retention panel.

Figure 5:
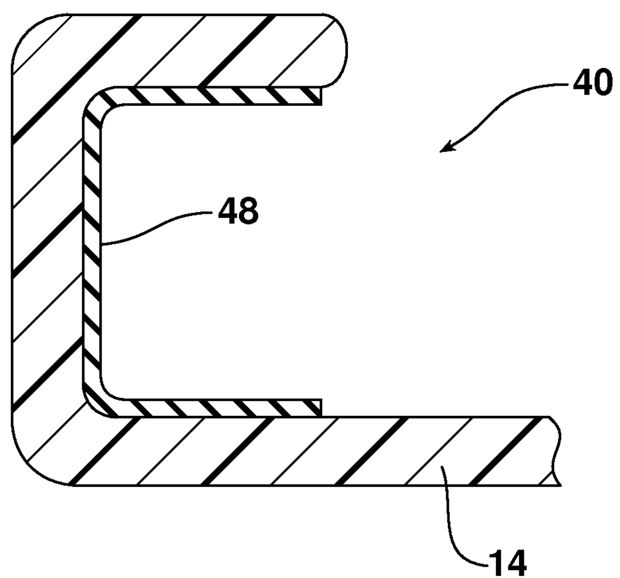

FIG. 5 is a cross-sectional view through the U-shaped channels.

Figure 6:
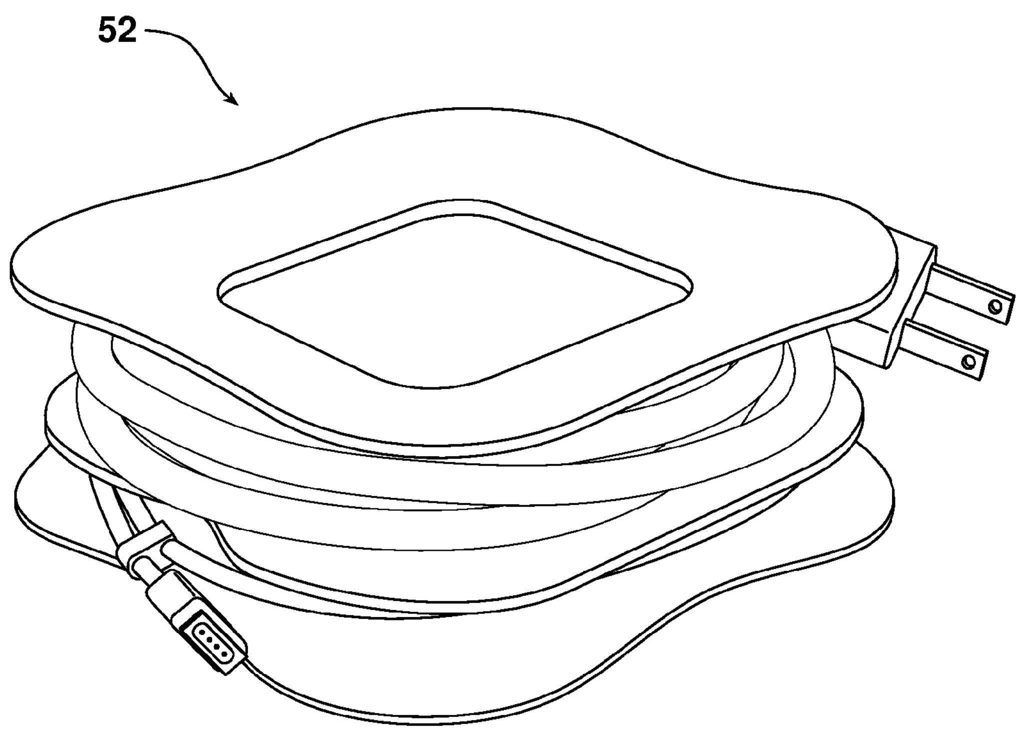

FIG. 6 is a detailed view of an optional cord wrap provided on the first or rear face of the retention panel.

Reference will now be made in detail to the present preferred embodiments of the integrated tray table, examples of which are illustrated in the accompanying drawing figures.

DETAILED DESCRIPTION

Figure 1:
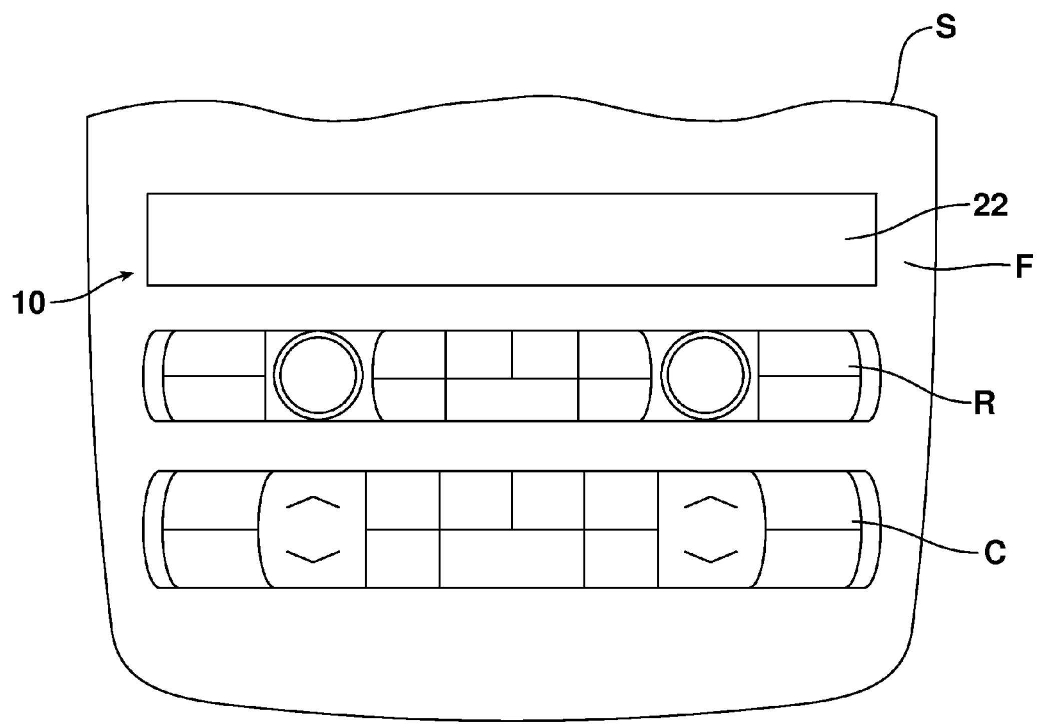
FIG. 1 is a front elevational view of the instrument panel/center stack of a vehicle equipped with the integrated tray table which is illustrated in the closed position.
Figure 2:
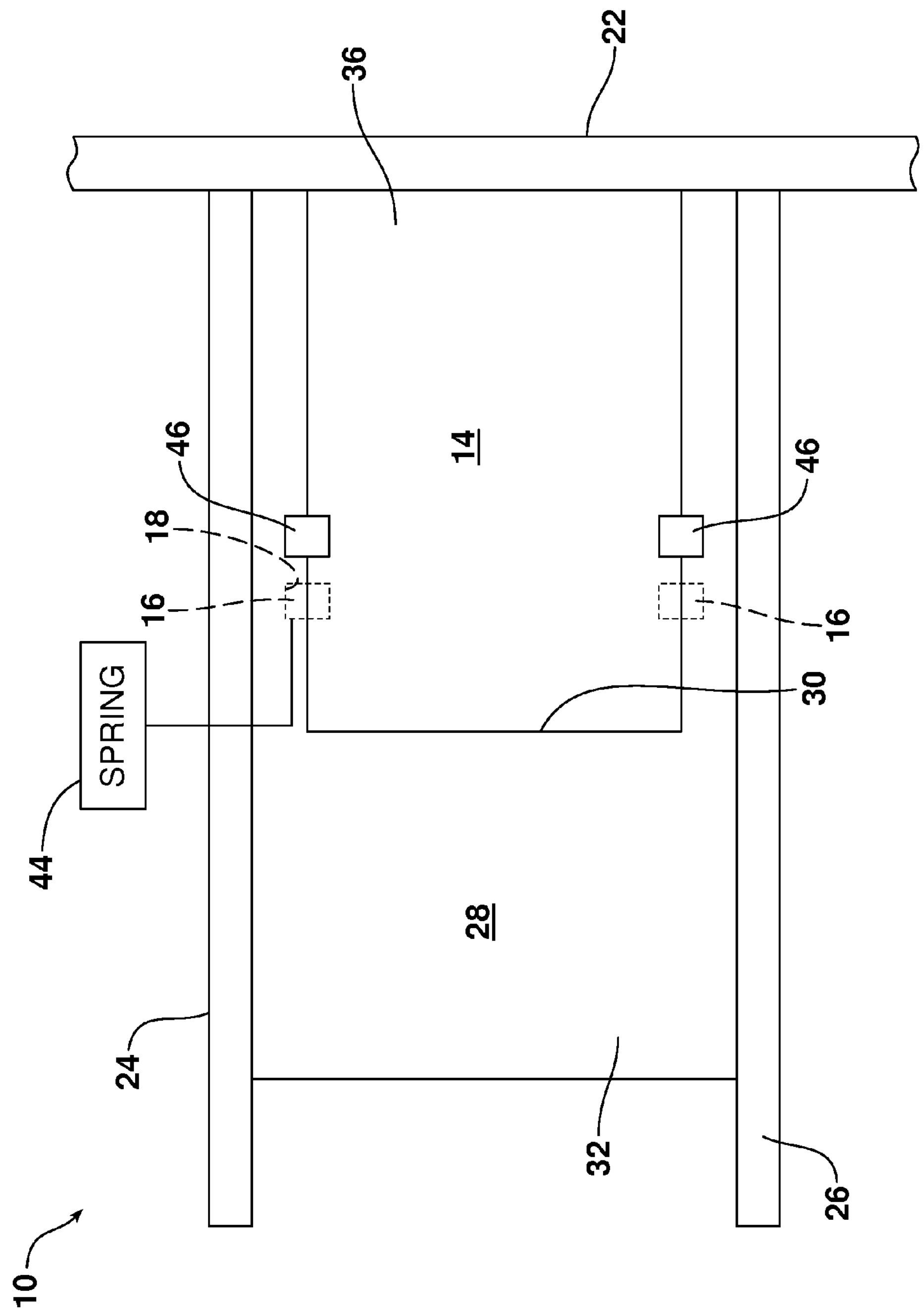
FIG. 2 is a schematic top plan view of the integrated tray table held in the closed position such as it would be oriented when held within the instrument panel/center control stack.

Reference is now made to FIG. 1 which illustrates the integrated tray table 10 in a home position within the instrument panel or center control stack S of a motor vehicle where it is positioned directly above the radio controls R and the climate control system controls C. As illustrated in FIGS. 2 and 3*a*, the tray table 10 includes a support 12 that extends in a first plane, such as the horizontal plane illustrated in the drawing FIGS. 1 and 2. Further the tray table 10 includes a retention panel 14 that is connected by means of a pivot 16 to the support 12. In one possible embodiment, the pivot 16 comprises two opposed pivot pins received in cooperating sockets 18 provided on the support 12. That said, it should be appreciated that substantially any appropriate structure known in the art may be utilized to provide the pivot 16.

In the home position illustrated in FIGS. 1, 2 and 3*a*, the retention panel 12 extends substantially parallel to or even within the first plane that holds the support 12. This allows the tray table 10 to be closed into the relatively limited vertical space provided in the center control stack S above the radio controls R. In contrast, in the deployed position the retention panel 14 extends or rests in a second plane at an angle to the first plane.

As illustrated in FIGS. 1, 2 and 3*a*, the support 12 includes a front face 22. When the tray table 10 is in the closed position, the front face 22 may fit flush with the face F of the instrument panel/center control stack S so as to provide an aesthetically pleasing appearance. As further illustrated in FIG. 2, the support 12 includes a first side rail 24, a second side rail 26 and a base panel 28 that extends between the two side rails. As should be appreciated, the side rails 24, 26 mesh with a track (not shown) that allows the tray table 10 to move from a closed position concealed behind the front face 22 within the instrument panel/center control stack S (see FIGS. 1 and 2) to an open position wherein the tray table 10 projects from the instrument panel/center control stack.

As further illustrated in FIGS. 2, 3*a* and 3*b*, the base panel 28 includes an opening 30. The retention panel 14 is received in that opening 30 where it is connected to the base panel 28 by the pivot 16. As should be further appreciated, the base panel 28 has a top face 32 and a bottom face 34 while the retention panel 14 has a first face 36 and a second face 38.

As illustrated in FIGS. 4 and 5, the retention panel 14 includes a U-shaped channel 40 that extends along a first edge thereof. In the illustrated embodiment, a U-shaped channel 40 is also provided along at least a portion of two opposing side edges of the retention panel 14. In the illustrated embodiment, the U-shaped channel 40 is provided on the second face 38 so as to be oriented toward the bottom face 34 of the base panel 20 when the retention panel 14 is in the home position (note FIGS. 2 and 3*a*).

As should be appreciated, when the tray table 10 is opened, the retention panel 14 pivots about the pivot 16 with respect to the base panel 28 from the home position illustrated in FIGS. 2 and 3*a* to the deployed position illustrated in FIG. 3*b*. In one possible embodiment, a torsion spring 44 connected between the base panel 28 and retention panel 14 adjacent the pivot 16 automatically biases the retention panel 14 into the deployed position when the tray table 10 is fully opened. Further, the spring 44 provides a positive force holding the retention panel 14 in the fully deployed position so as to resist any annoying shake or vibration. Cooperating opposed stops 46 provided on the retention panel 14 project outwardly from the opposing side edges thereof so that they engage the base panel 28 when the retention panel is pivoted about the pivot 16 to the deployed position. These stops 46 may be made from resilient material to further dampen any vibration of the retention panel 14.

In the illustrated embodiment, the retention panel 14 pivots approximately 110 degrees from the home position to the deployed position (note action arrow A in FIG. 3*b*). As should also be appreciated, the stops 46 also engage the base panel 28 when the retention panel 14 is in the home position. Thus, the stops 46 establish both of the home and fully deployed positions. In order to provide this dual function, it should be appreciated that the stops 46 are positioned on the retention panel 14 between (a) the pivot 16 and (b) the U-shaped channel 40 and/or the front face 22 of the support when the retention panel is in the home position.

Reference is now made to FIG. 4 clearly illustrating how a smartphone P may be conveniently held on the retention panel 14 by the U-shaped channel 40. As should be appreciated, the bottom portion of the U-shaped channel 40 forms a shelf that supports the smartphone P against the pull of gravity while the side portions of the channel 40 prevent the smartphone from sliding back and forth and potentially off the retention panel 14 as the motor vehicle is maneuvered around corners. In one possible embodiment, the walls of the channel 40 are flexible and resilient. Accordingly, the channel walls function to positively grasp and hold the smartphone P in position on the retention panel 14 even when the vehicle is turned rapidly such as may occur when trying to avoid an obstacle on the road or a potential collision with another vehicle. As illustrated in FIG. 4, the bottom of the channel 40 may include a hole 50 to allow the smartphone P to be connected to a charge plug G.

As illustrated in FIG. 5, the U-shaped channel 40 may be lined with a padding material 48 such as a soft, pliable silicone padding. Advantageously, the U-shaped channel 40 extends just slightly over the top outer margin of the smartphone P so as to positively hold the smartphone on the retention panel 14 even in the event of an emergency stop.

After use the operator may simply (a) slide the smartphone P out from the U-shaped channel 40, (b) rotate the retention panel about the pivot 16 against the force of the biasing spring 44 from the deployed position to the home position where the stops 46 engage the support 12 and then (c) push the front face 22 of the support so as to return the tray table 10 to the closed position illustrated in FIG. 1 within the instrument panel/center control stack S.

The foregoing has been presented for purposes of illustration and description. It is not intended to be exhaustive or to limit the tray table to the precise form disclosed. Obvious modifications and variations are possible in light of the above teachings. For example, while two opposed stops 46 are illustrated, the tray table 10 may incorporate one stop on one side if desired. In addition, as illustrated in FIGS. 3*a*, 3*b* and 6, the face 36 of the retention panel 14 may include a cord retainer 52 such as the illustrated cord wrap which may be used to help retain a smartphone charge cord out of way of the rest of the instrument panel/center control stack during use. All such modifications and variations are within the scope of the appended claims when interpreted in accordance with the breadth to which they are fairly, legally and equitably entitled.

What is claimed:

1. An integrated tray table for a motor vehicle, comprising:
a support extending in a first plane; and
a retention panel including a pivot connecting said retention panel to said support, said retention panel being pivotally displaceable about said pivot between a home position wherein said retention panel extends substantially parallel to or within said first plane and a deployed position wherein said retention panel rests within a second plane at an angle to said first plane.

2. The tray table of claim 1, wherein said support includes a front face.

3. The tray table of claim 2, wherein said retention panel further includes a stop, said stop being positioned on said retention panel between said pivot and said front face when said retention panel is in said home position.

4. The tray table of claim 3, wherein said support includes a first side rail and a second side rail.

5. The tray table of claim 4, wherein said support includes a base panel extending between said first and second side rails.

6. The tray table of claim 5, wherein said base panel includes an opening and said retention panel is received in said opening and pivotally connected to said base panel.

7. The tray table of claim 6, wherein said base panel has a top face and a bottom face and said retention panel has a first face and a second face.

8. The tray table of claim 7, wherein said retention panel includes a u-shaped channel.

9. The tray table of claim 8, wherein said u-shaped channel extends along a first edge of said retention panel.

10. The tray table of claim 9, wherein said u-shaped channel is provided on said second face so as to be oriented toward said bottom face when said retention panel is in said home position.

11. The tray table of claim 10, wherein said u-shaped channel extends along at least a portion of two opposing side edges of said retention panel.

12. The tray table of claim 11, wherein said stop projects from said first face of said retention panel.

13. The tray table of claim 12, wherein said stop projects outwardly from at least one of said first and second opposing side edges.

14. The tray table of claim 13, wherein said pivot comprises two opposed pivot pins and said stop comprises two opposed stop tabs.

15. The tray table of claim 13, wherein said support forms a drawer received within an instrument panel of the motor vehicle.

16. The tray table of claim 1, wherein said support forms a drawer received within an instrument panel of the motor vehicle and said tray table further includes a biasing element that biases said retention panel into said deployed position when said drawer is fully open.

17. The tray table of claim 1, wherein said support includes a base panel.

18. The tray table of claim 17, wherein said base panel includes an opening and said retention panel is received in said opening and pivotally connected to said base panel.

19. The tray table of claim 1, wherein said retention panel includes a u-shaped channel.

20. The tray table of claim 19, wherein said u-shaped channel extends along a first edge of said retention panel and is lined with a padding material.

* * * * *